Aug. 14, 1928.

H. H. CULVER 1,680,323

WATER FILTER ATTACHABLE TO FAUCETS

Filed July 16, 1925

Herbert Hudson Culver
INVENTOR:

Patented Aug. 14, 1928.

1,680,323

UNITED STATES PATENT OFFICE.

HERBERT HUDSON CULVER, OF ST. LOUIS, MISSOURI.

WATER FILTER ATTACHABLE TO FAUCETS.

Application filed July 16, 1925. Serial No. 43,968.

This invention consists of the following parts, as follows:—

Figure 1:
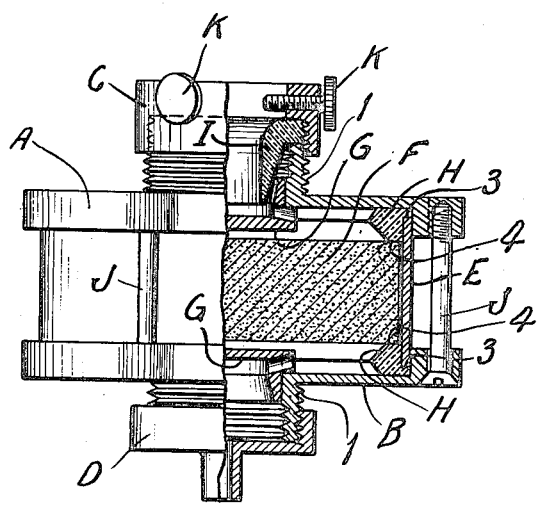
Figure 1, is the filter asembled and complete, ready to apply to the faucet.
Figure 2:
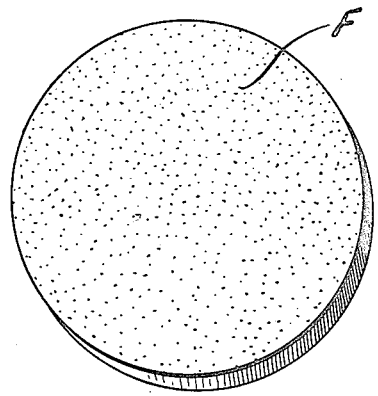
Figure 2, is a perspective view of the filter stone.

This contains two main caps A and B, two smaller caps C and D, a piece of seamless brass tubing, E, a disc filter stone F, two baffle plates G, two rubber ring gaskets H, rubber taper bushing I, three machine screws and three knurled set screws. These make up the filter.

Referring more particularly to the separate parts of this invention, their construction and use can best be explained by assembling the filter part by part, so, beginning with:

Cap, A, is constructed so as to receive one of the ring gaskets, H, on the inside, hence is grooved out and so shaped. It also has a neck, 1, which is threaded on the inside, permitting a hose connection faucet to be attached when needed. A baffle plate, G, is fitted into the neck, 1, by suitable means. This cap, A, is also made with lugs set 120 degrees apart and threaded, so as to permit the insertion of machine screws, J, that hold caps A and B together with the aid of tubing, E.

Cap, B, is made similar to cap, A, only the lugs are not threaded, and in event of using thumb screws instead of threading the lugs on cap, A, the machine bolts are extended through the lugs so that the thumb screws can be attached. This cap also contains one of the rubber ring gaskets, H, and forms the top cap.

Before placing cap, B, in position, the brass tubing, E, is placed inside cap, A, and rests on flange, 3, of the ring gasket, H. The filter stone, F, is also placed inside the tubing E, and rests on the upraise, 4, of the ring gasket, H.

I now place cap, B, on the top of tubing, E, and fasten the two main caps A and B together with the aid of the machine screws, J, tightening until the filter bowl becomes water-tight.

I now assemble cap, C, which is made to screw on the neck of either cap, A or B, and is therefore threaded on the inside.

This also receives the taper bushing, I, and has holes drilled and threaded and placed at 120 degrees, in which are screwed the knurled set screws, K, by which arrangement the filter is held in place on the faucet.

Cap, D, is called the antisplash cap which concentrates the outflow of water from the filter. It is also so constructed that a rubber hose may be attached, to fill any receptacle that cannot be placed under the filter, but can be filled from the side.

I claim:

1. In a filter for service on a faucet, a body comprising paired retaining members and a tube spacing said retaining members, the retaining members having co-operating annular grooves and axially concentric internally and externally threaded necks, ring gaskets seated in said grooves and spacing the tube ends from the retaining members, a filter element within the tube and bearing on said ring gaskets, and means for securing the retaining members to retain the elements assembled therein.

2. In a filter for service on a faucet, a body comprising paired retaining members and a tube spacing said retaining members, the retaining members having axially concentric internally and externally threaded necks, ring gaskets spacing the tube ends from the retaining members, a filter element within the tube and bearing on said ring gaskets, a taper bushing having feathering depending edge and adapted to seat in said sleeve adjacent the mouth of the faucet, and means for securing the retaining members to retain the elements assembled therein.

3. In a filter for service on a faucet, a body comprising paired retaining members and a tube spacing said retaining members, said retaining members having necks, the retaining members having co-operating annular grooves and axially concentric internally and externally threaded necks, ring gaskets spacing the tube ends from the retaining members, a filter element within the tube and bearing on said ring gaskets, a taper bushing having feathering depending edge and adapted to seat in one of said necks adjacent the mouth of the faucet, a nozzle provided with an annular shoulder having means of attachment to one of said necks of a retaining member, and means for securing the retaining members to retain the elements assembled therein.

4. In a filter for service on a faucet, a body comprising paired retaining members and a tube spacing said retaining members, the retaining members having cooperating annular grooves and axially concentric necks internally and externally screw threaded, ring gaskets designed to seat in said grooves and having external lateral basal flanges constituting respectively seats for the ends of said tube, the outer surface of said ring gaskets having shoulders, a filter element within the tube and bearing on said ring gasket shoulders, a sleeve member adapted for screw threaded engagement with the neck of a retaining member and adapted for attachment to a faucet for the purpose of supporting the device on said faucet, and means for detachably securing the retaining members to retain the elements assembled therein.

5. In a water filter for a faucet, a body comprising paired retaining members and a tube spacing said retaining members, the retaining members having co-operating annular grooves and axially concentric necks internally and externally screw threaded, ring gaskets designed to seat in said grooves and having external lateral basal flanges constituting respectively seats for the ends of said tube, the outer surfaces of said ring gaskets having shoulders, a filter stone within the tube and bearing on the said shoulders of said ring gaskets, baffle plate members each comprising a cylindrical body seated in the neck of the retaining member, and a perforated closure for one end thereof, a sleeve member adapted for screw threaded engagement with the neck of a retaining member and adapted for attachment on a faucet for the purpose of supporting the device on said faucet, a taper bushing having feathering depending edge and adapted to seat in said sleeve adjacent the mouth of the faucet, a nozzle provided with an annular shoulder having means of attachment to the neck of a retaining member, and means for securing the retaining members to retain the elements assembled therein.

6. In a filter for service on a faucet, a body comprising paired retaining members, and a tube spacing said retaining members, the retaining members having annular grooves and inlet and outlet necks, ring gaskets seated in said grooves and spacing the tube ends from the retaining members, a filter element within the tube and bearing on said gaskets and means for securing the retaining members to retain the elements assembled therein.

HERBERT HUDSON CULVER.